Jan. 28, 1969   O. SCHWEIZER   3,424,057
HYDRAULIC PRESSURE CONTROL SYSTEM
Filed April 19, 1966
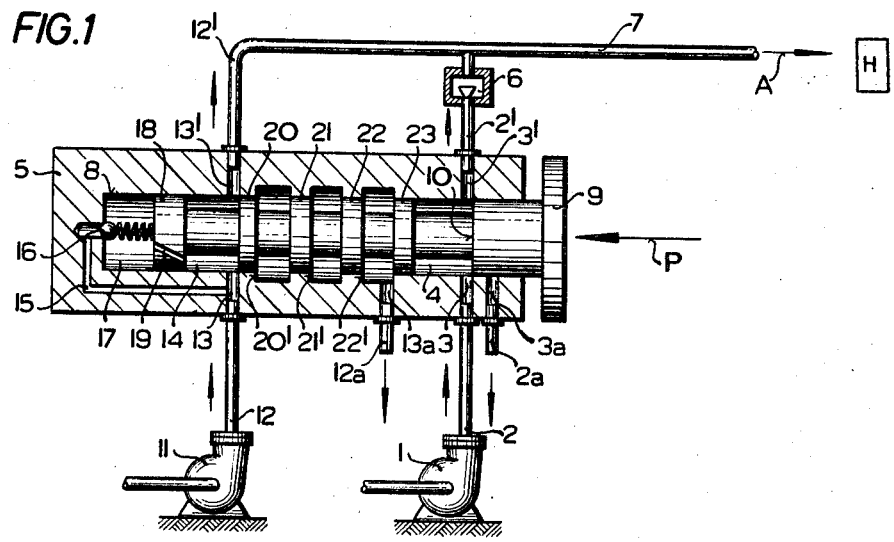
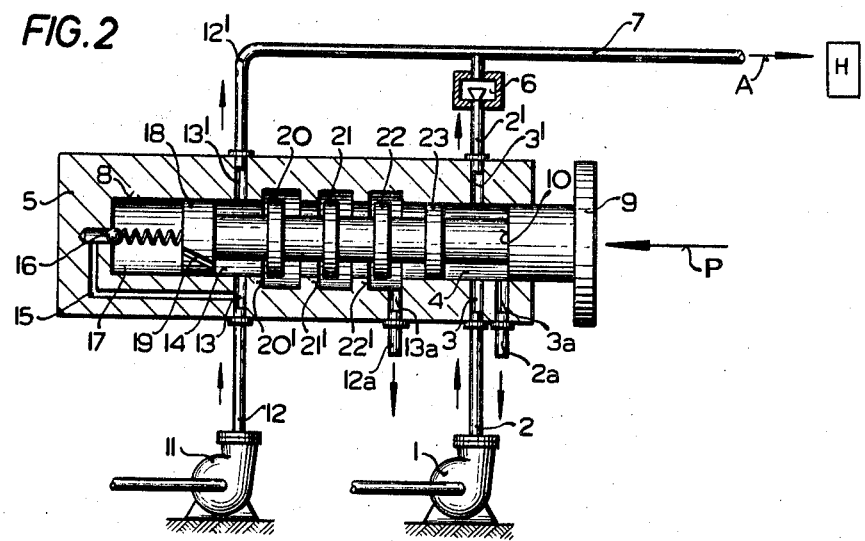

United States Patent Office 3,424,057
Patented Jan. 28, 1969

3,424,057
HYDRAULIC PRESSURE CONTROL SYSTEM
Otto Schweizer, Stuttgart-Munster, Baden-Wurttemberg, Germany, assignor to Werner & Pfleiderer, Stuttgart-Feuerbach, Germany
Filed Apr. 19, 1966, Ser. No. 543,731
Claims priority, application Germany, Apr. 21, 1965, W 39,008
U.S. Cl. 91—29                                                        6 Claims
Int. Cl. F15b *13/042;* F16h *41/02;* G05d *11/00*

ABSTRACT OF THE DISCLOSURE

A four-way spool valve for automatically operating a hydraulic device from a low-pressure source of liquid and a high-pressure source of liquid having throttling and damping means for controlling movements of the spool.

---

This invention relates to a hydraulic pressure control system for automatically operating a hydraulic device from a low pressure source of liquid and a high pressure source of liquid.

In hydraulic presses where the pressure is to be brought to a given maximum, and rapidly reduced again to zero, difficulties arise owing to the fact that in practice it is not possible to switch a high pressure delivery pump on and off in a correspondingly rapid sequence, because the pump has to have a certain output in order to compensate for leakage losses. In one known form of hydraulic control system this problem has been attempted to be solved by providing two separate flow circuits, a large capacity low pressure circuit and a low capacity high pressure circuit, which act on a common press working cylinder, the control of the high pressure and low pressure flow circuits being effected by means of a control valve in the form of a spool valve in such a way that the low pressure circuit is produced by a delivery pump having a high output and low pressure, in order to initially move the press cylinder quickly. When the maximum pressure of the low pressure pump is reached, the low pressure flow circuit is switched by the control valve to practically pressureless circulation by passing the output back to the pump reservoir, whilst a second pump having a low output and high operative pressure produces the high pressure flow circuit and brings the press cylinder to the predetermined pressure. When this pressure is reached, the control valve automatically diverts the flow from the high pressure pump to exhaust to relieve the system pressure and then reconnects the press with the low and high pressure sources for the next press operation.

Besides the harmful effect of the jet pressure acting on the spool valve and the consequent intensive wear phenomena, there is a risk in such arrangements of hydraulic jolts and resultant rattling of the spool valve. If, on the other hand, the high pressure flow circuit circulates permanently by way of a safety valve, there is the danger that the pressure oil will be too greatly heated and the power requirements of the entire plant and hence the operating costs will be relatively high.

The present invention consists in a hydraulic pressure control system for automatically operating a hydraulic device from a low pressure source of liquid and a high pressure source of liquid, said system comprising a valve body, a spool axially slidable in said body, said body and said spool together defining first and second valve means for respectively connecting the low and high pressure sources to the device when the system pressure is below a first value, means for automatically moving the first valve means at said pressure value to direct liquid from the low pressure source for flow in a reduced pressure circuit, means for automatically moving the second valve means when a higher system pressure is reached to divert liquid from the high pressure source to flow through throttling means in a reduced pressure circuit and thereby reduce the system pressure below the first value, means for then returning the first and second valve means to their initial positions connecting both liquid sources to the hydraulic device, and damping means for retarding the return of the valve means.

In a preferred form of the invention, as set out above, the system comprises a spool valve with an axially movable spool, a first valve chamber formed between a pair of spool flanges constituting the first valve means, said chamber communicating with inlet and outlet ports formed in the valve body for the low pressure liquid, a low pressure fluid exhaust port closed from the chamber by a spool flange when the spool is in one position and communicating with the chamber when the spool is moved axially in one direction, a second valve chamber formed between another pair of spool flanges constituting the second valve means, said chamber communicating with inlet and outlet ports in the valve body for the high pressure liquid, and a high pressure liquid exhaust port in the body closed from the second chamber by a spool flange when the spool is in said one position and which communicates with the second valve chamber through a throttling chamber when the spool is moved axially in said direction.

One end of the valve spool may be formed as a piston operating in a cylinder, which piston and cylinder constitutes the damping means.

One embodiment of the invention is illustrated by way of example in the accompanying drawings, in which:

FIGURE 1 is a diagrammatic view of a hydraulic control system showing its control spool valve in cross-section in one of its operating positions, FIGURE 2 is a diagrammatic view of the system showing the spool valve in cross-section in another of its operating positions.

Referring to the drawings, a pump 1 with high volume output and a lower operating pressure, designated hereunder as low pressure delivery pump, supplies pressure fluid via a pipe 2 through a bore 3 into a pressure chamber 4 in a spool valve casing 5. The chamber 4 is connected by air outlet bore 3' to a pipe 2', through which the pressure fluid is conveyed via a non-return valve 6 in the direction of arrow A to a pipe 7 leading to a hydraulic device H for example to a press cylinder.

A simultaneously operating pump 11 with a low volume output and a high operating pressure, hereinafter called the high pressure delivery pump supplies via a pump 12 and a bore 13 provided in the casing 5, a high pressure chamber 14, which is connected by an outlet bore 13' and a pipe 12' to the main pipe 7 leading to the consumer. When, therefore, the low pressure pump is by-passed or switched to pressureless circulation, as will be described, the high pressure delivery pump 11 continues to supply the hydraulic device H (press cylinder) via the pipes 12' and 7, until the given maximum pressure is reached.

The high pressure delivery pump 11 also supplies via a pipe 15, branched from the bore 13, and a non-return valve 16, a pressure chamber 17, which is separated from the pressure chamber 14 by a piston 18 formed at one end of a valve spool 9. According to the setting of the non-return valve 16, the pump 11, before the maximum pressure is reached, supplies the pressure chamber 17, so that the same pressure conditions prevail in the latter and in the pressure chamber 14 until the said maximum pressure is reached, because the piston 18 has a relieving slot 19 in the form of a bore or a groove which connects the pressure chambers 14 and 17. Between the high pressure chamber 14 and the low pressure chamber 4 in the valve casing 5, the valve spool 9 has individual flanges designed as slides 20, 21 and 22 sealing off the bore 8, the pressure chamber 4 being closed at its high pressure side by a further flange 23 designed as a slide.

In operation, initially both pumps supply the hydraulic device H through pipe 7. As the pressure builds up, the spool moves to the right against a force P, for example a spring, so that when a predetermined system pressure is reached, a bore 3a is freed by the surface of the slide member 9, whereby the valve 6 closes and the low pressure delivery pump is bypassed or switched to circulation and operates practically without pressure. At this stage, pump 11 continues to supply the press through line 7, the dimensions of the spool valve being such that flanges 22, 21 and 23 have not moved completely off their seats.

When the given maximum pressure is reached, the flanges 20, 21, 22 move off their seats and the spool assumes the position shown in FIGURE 2.

The maximum pressure prevailing in the pressure chamber 14 is gradually decreased to zero in three throttle stages 20, 20'; 21, 21'; and 22, 22' formed by the slides 20, 21, 22 and their corresponding shoulders in the casing 5, the pressure in the line 7 and the chamber 14 being discharged through a bore 13a in the casing 5 following the last slide 22 and an adjoining pipe 12a.

As already stated, on reaching of the maximum pressure, equal pressure prevails in the pressure chambers 14 and 17, so that at the moment at which the slides 20, 21 and 22 open, the piston 18 is, owing to the resultant pressure drop between the chambers 17 and 14, due to the collapse of pressure in the chamber 14, moved further to the right, that is rapidly into an increasingly open position, because the pressure cannot be released form chamber 17 so quickly through the relieving slot 19.

When the pressure has been released, the movable part 9 is returned by force P to its position according to FIGURE 1, so that both pumps 1 and 11 again supply the pipe 7, i.e. the press cylinder, and the working rhythm described can be repeated in rapid sequence.

I claim:

1. A hydraulic pressure control system including a hydraulic device, a low pressure source of liquid, a high pressure source of liquid, a valving arrangement connected between the high and low pressure sources of liquid and the hydraulic device, the valving arrangement comprising a valve body and a spool axially slidable in said body, said body and said spool together defining first and second valve means for respectively connecting the low and high pressure sources to the device when the system pressure is below a first value means for automatically moving the first valve means at said pressure value to direct liquid from the low pressure source for flow in a reduced pressure circuit, throttling means, means for automatically moving the second valve means when a high system pressure is reached to divert liquid from the high pressure source to flow through the throttling means in a reduced pressure circuit and thereby reduce the system pressure below the first value, means for then returning the first and second valve means to their initial positions connecting both liquid sources to the hydraulic device, and damping means for retarding the return of the valve means.

2. A system as claimed in claim 1, comprising a first valve chamber formed between a pair of spool flanges constituting the first valve means, said chamber communicating with inlet and outlet ports formed in the valve body for the low pressure liquid, a low pressure fluid exhaust port closed from the chamber by a spool flange when the spool is in one position and communicating with the chamber when the spool is moved axially in one direction, a second valve chamber formed between another pair of spool flanges constituting the second valve means, said second chamber communicating with inlet and outlet ports in the valve body for the high pressure liquid, a throttling chamber in said body and a high pressure liquid exhaust port in the body closed from the second chamber by a spool flange when the spool is in said one position and which communicates with the second valve chamber through the throttling chamber when the spool is moved axially in said direction.

3. A system as claimed in claim 2, wherein one end of the valve spool is formed as a piston operating in a cylinder, which piston and cylinder constitutes the damping means.

4. A system as claimed in claim 3, in which the cylinder is adapted to receive liquid from the high pressure source and communicates with the second valve chamber by a duct through the piston.

5. A system as claimed in claim 4, in which the spool valve includes a plurality of throttling chambers.

6. A system as claimed in claim 5, in which each throttling chamber has the same diameter.

References Cited

UNITED STATES PATENTS

| 730,273 | 6/1903 | Lane | 91—29 |
|---|---|---|---|
| 1,103,035 | 7/1914 | Clark | 91—29 |
| 1,805,367 | 5/1931 | King | 91—29 |
| 2,853,057 | 9/1958 | McAuley | 91—50 |
| 2,948,262 | 8/1960 | Gratzmuller | 91—426 |
| 2,980,064 | 4/1961 | Norton | 91—50 |
| 3,241,462 | 3/1966 | Karazija | 137—494 |

FOREIGN PATENTS 203,039   4/1959   Austria.

EDGAR W. GEOGHEGAN, *Primary Examiner.*

U.S. Cl. X.R.

60—52; 137—116